(12) United States Patent
Gassler

(10) Patent No.: US 6,179,511 B1
(45) Date of Patent: *Jan. 30, 2001

(54) QUICK-ACTION CONNECTING DEVICE

(76) Inventor: Kurt Gassler, Erpfmühle, D-7419 Sonnenbühl-Erpfingen (DE)

(*) Notice: Under 35 U.S.C. 154(b), the term of this patent shall be extended for 0 days.

This patent is subject to a terminal disclaimer.

(21) Appl. No.: 07/691,053
(22) PCT Filed: Jul. 12, 1990
(86) PCT No.: PCT/EP89/01580
 § 371 Date: Sep. 25, 1991
 § 102(e) Date: Sep. 25, 1991
(87) PCT Pub. No.: WO90/07652
 PCT Pub. Date: Jul. 12, 1990

(30) Foreign Application Priority Data

Dec. 24, 1988 (DE) .................................. 38 43 911

(51) Int. Cl.$^7$ ...................................................... F16B 7/04
(52) U.S. Cl. ...................... 403/322.1; 403/329; 403/189; 403/170
(58) Field of Search ................................... 403/326, 327, 403/329, 322.1, 322.4, 189, 246, 170, 171, 174, 176, 178, 217, 218

(56) References Cited

U.S. PATENT DOCUMENTS

| | | | |
|---|---|---|---|
| 2,427,841 | * 9/1947 | Dichter | 40/329 X |
| 2,885,822 | * 5/1959 | Onanian | 403/327 X |
| 2,905,992 | * 9/1959 | Swick | 403/326 |
| 3,569,903 | * 3/1971 | Brishka | 403/322.1 X |
| 3,574,367 | * 4/1971 | Jankowski | 403/322.1 X |
| 4,247,216 | * 1/1981 | Pansini | 403/329 X |
| 4,431,331 | * 2/1984 | Brody | 403/329 X |
| 5,315,805 | * 5/1994 | Harsch | 403/170 X |

FOREIGN PATENT DOCUMENTS

0681182 * 8/1979 (RU) ........................ 403/327

* cited by examiner

Primary Examiner—Lynne H. Browne
Assistant Examiner—John Cottingham
(74) Attorney, Agent, or Firm—Michael J. Striker

(57) ABSTRACT

A quick-action connecting device for the detachable connection of wall or frame parts has a locking body manufactured from a U-shaped leaf spring ending in locking noses which can be inserted into openings of a part to be held. The openings are provided with undercut portions, and the locking noses can be fixed in their locking position by means of a rotating body by spreading. The rotating body can press on the springing U-legs of the leaf spring. The quick-action connecting device can be anchored, by means of projections of its rotating body or a bearing journal, in one of two parts to be connected with one another.

5 Claims, 9 Drawing Sheets

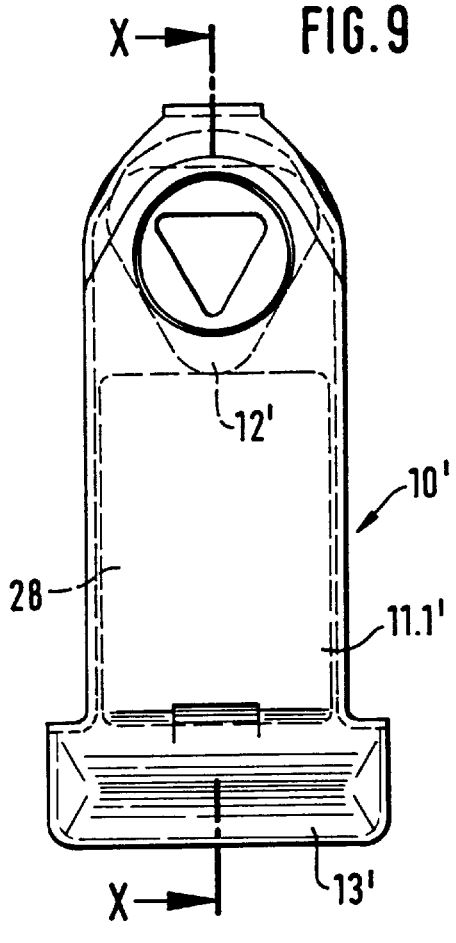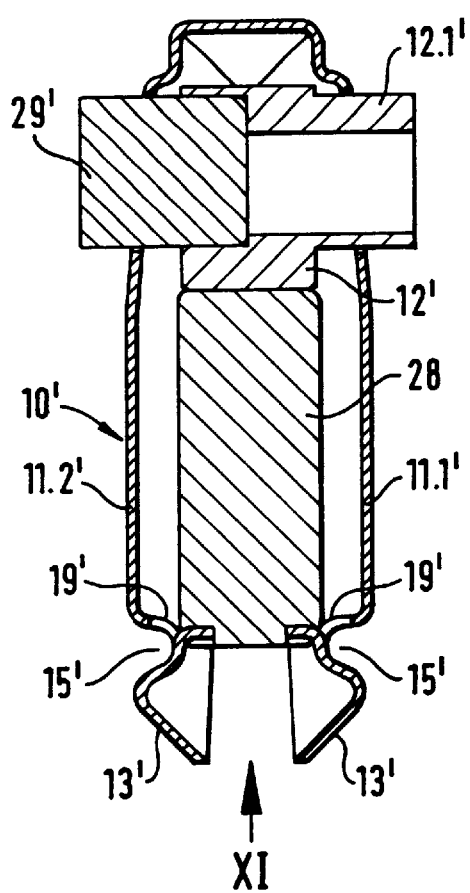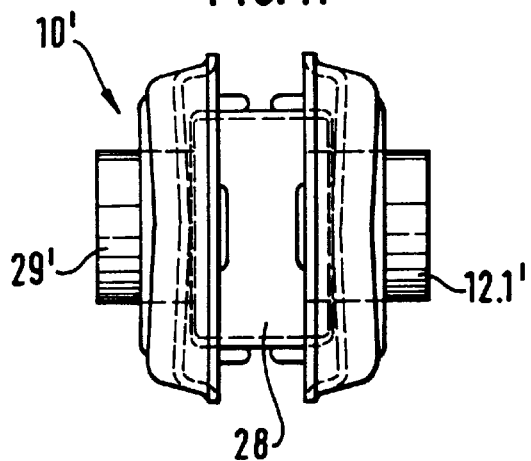

QUICK-ACTION CONNECTING DEVICE

BACKGROUND OF THE INVENTION

The invention is directed to a quick-action connecting device for the detachable connection of wall or frame parts, particularly for dismountable fair buildings, which can be anchored in one of the parts to be connected with one another and holds an adjustable locking body which comprises a leaf spring which is bent in a U-shaped manner and whose U-leg ends are shaped to form locking noses which can dip into an opening of the other of the two parts to be connected with one another, which opening comprises undercut portions, and which can be clamped by means of a rotating body.

A clamping lock is known from DE-GM 19 70 271. This clamping lock has the disadvantage that it requires its own lock housing for the bearing of the rotating body. The utilized leaf spring forms only a draw bolt which can be adjusted and clamped only in the longitudinal direction of the leaf spring. The flat U-leg ends which are bent out to form locking noses cannot be removed again from an opening of a part to be connected simply by means of pulling when the rotating body is locked, so that it is difficult to detach a connection.

SUMMARY OF THE INVENTION

The object of the invention is to design such a quick-action connecting device of the above type in a simple manner and in such a way that it holds together the parts to be connected with one another already in the unlocked state and accordingly facilitates an assembly of a plurality of parts.

The proposed object is met with a quick-action locking device of the type named in the beginning, according to the invention, with the features indicated in the characterizing part of the main claim.

The construction of the locking body as an expanding spring body which can be pushed in and out easily in the unlocked state and which comprises a locking nose or locking noses has the advantage that a loose locking connection can be provided between the parts to be connected with one another with this locking body already when assembling the parts without the quick-action connecting device being fixed immediately by turning the rotating body into a locking position. The rotating body which is supported directly in the U-shaped leaf spring acts on the U-leg of the leaf spring in the expanding direction. As a result of its simple design, the quick-action connecting device can easily be adapted to extruded sections with continuous undercut grooves and cavities from which the frames for dismountable fair buildings and the like are usually manufactured.

The leaf spring and the rotating body can be constructed differently. For example, in one possible embodiment form the rotating body can have the cross section of an equilateral triangle with rounded corners and can comprise an insertion opening on at least one front side for a tool for turning the rotating body. The rotating body cooperates with curved out portions and/or curved in portions of the locking body, which is manufactured from the leaf spring, in order to fix the quick-action connecting device in a locking position in the insertion plane by means of expansion as well as clamping. In an embodiment form of the quick-action connecting device which is preferred for larger constructions, the rotating body can be constructed as a double-armed swiveling lever whose one arm forms the projection acting on the U-leg of the locking body and whose other arm forms a point of application for a locking tool. In this embodiment form, the U-shaped leaf spring can be advantageously placed around a bearing journal at the U-base, the axis of the bearing journal extends vertically relative to the axis of rotation of the rotating body and, for the purpose of anchoring the leaf spring in one of the parts to be connected with one another, the ends of the bearing journal project into recesses of this part. The separation of the anchoring point of the locking body into one of the parts to be connected and the bearing for the rotating body, which separation is effected in this embodiment form of the locking body, provides the advantage that the bearing for the rotating body can be arranged so as to be out of sight inside one of the parts to be connected with one another, which part need have only one opening in this area located on another side of the part for inserting a locking tool. Moreover, at the anchoring point, the clamping action caused by the rotating body can only effect a tensile force loading of this anchoring point. Turning moments occurring during the clamping of the rotating body can have no influence on the anchoring area in this case. In so doing, it is advisable that the distance between the bearings for the rotating body, which are constructed in the U-legs of the leaf spring, and the anchoring point of the locking body situated at the U-base of the leaf spring be selected so as to be greater than the length of the bearing journal, and the U-legs of the leaf spring can advisably extend in a planar manner between the U-base and the bearings for the rotating body.

The support of the quick-action connecting device in one of the parts to be connected can thus be effected solely by means of the parts of the rotating body projecting out through the bearing openings of the U-legs of the leaf spring or by means of a separate bearing journal arranged at the U-base of the leaf spring. The quick-action connecting device cannot be destroyed by excessive turning. In the first embodiment example with the triangular rotating body, this is ensured by means of the symmetrical shape of the rotating body. In the construction of the rotating body as double-armed swivel arm, protection against excessive turning is provided in that the utilized locking tool comes to rest at one of the parts to be connected when the locking position is reached and cannot swivel any further.

The legs of the U-shaped leaf spring advisably end in two locking noses which are constructed adjacent to one another and can define a locking groove together with a counter-projection with its end facing inward. The protection of the quick-action connecting device against twisting is improved by means of the two locking noses which are constructed adjacent to one another. A separate housing for the quick-action connecting device which is provided with stops and guide surfaces is dispensed with in any event.

The leaf spring can be manufactured in an advantageous manner from a material, such as steel, which is harder than the parts to be connected with one another, which can comprise light metal or plastics material. When the leaf spring is tensioned, the locking noses can accordingly press somewhat into the surface of the part to be held or the wall of this part can curve out within the range of extensibility of its material. The leaf spring is prevented from sliding along at this part in this manner also when the other part is loaded in the longitudinal direction of the first part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 9 shows a top view of an embodiment form of a quick-action device which is modified relative to FIGS. 1 to 3;

FIG. 10 shows a longitudinal section through the quick-action connecting device along line X—X in FIG. 9;

FIG. 11 shows a front view of the quick-action connecting device in the direction of arrow XI in FIG. 10;

DESCRIPTION OF PREFERRED EMBODIMENTS

Figure 1:
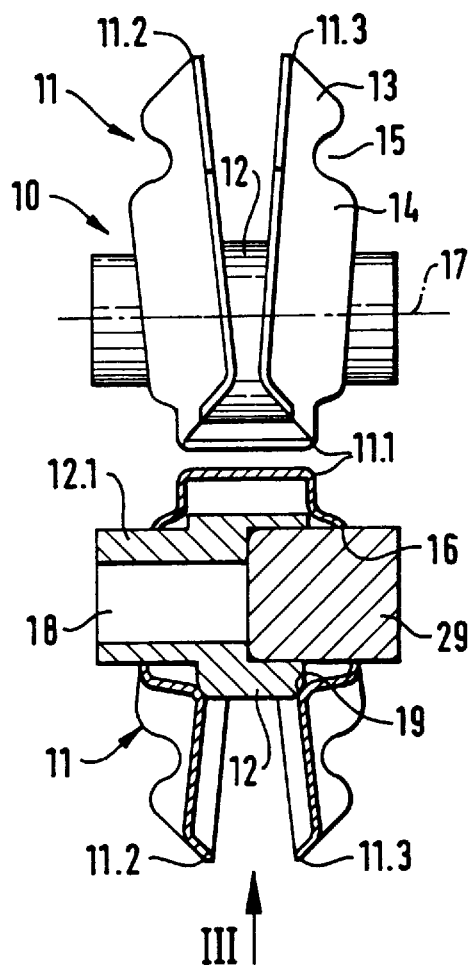
FIG. 1 shows a side view of two identical quick-action connecting devices of a first embodiment form which are arranged in a mirror-inverted manner relative to one another, one of which is shown in longitudinal section along line I—I in FIG. 2.
Figure 2:
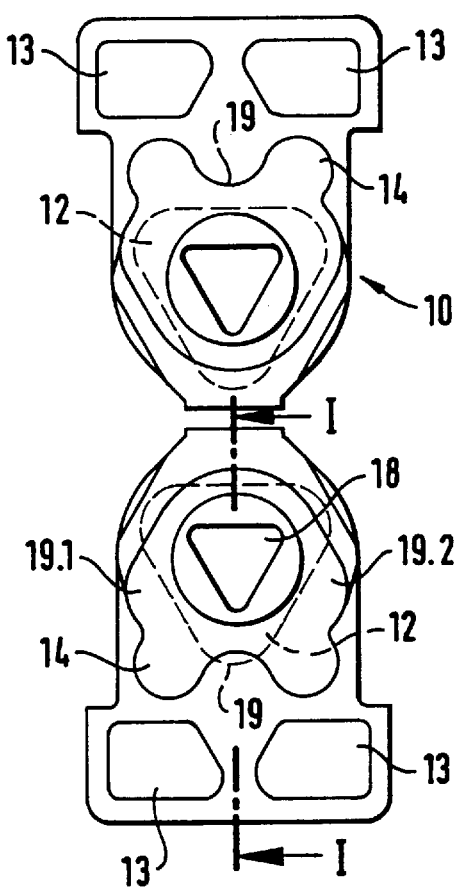
FIG. 2 shows a top view of the two quick-action connecting devices of FIG. 1.
Figure 3:
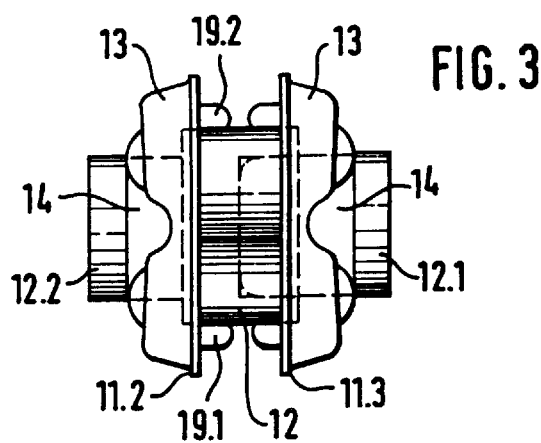
FIG. 3 shows a top view of one of the quick-action connecting devices in the direction of the arrow III in FIG. 1.

The quick-action connecting device 10 shown in pairs in FIGS. 1 to 3 comprises a locking body 11 and a rotating body 12. The locking body is formed from a sectioned leaf spring which is bent in a U-shaped manner and comprises a base part 11.1 and two U-legs 11.2 an 11.3. Two adjacent locking noses 13 are formed at the widened free ends of the two U-legs 11.2 and 11.3 by means of embossed portions the locking noses 13, together with a counter-projection 14, which is likewise formed by means of an embossed portion, define a locking groove 15 on the outside of each U-leg 11.2 and 11.3.

The two U-legs 11.2 and 11.3 are provided in the area of the counter-projection 14 with a round opening 16 which serves as a bearing opening for the rotating body 12 arranged between the U-legs 11.2 and 11.3. The cross section of the rotating body 12 has the shape of an equilateral triangle with rounded corners as can be seen from FIG. 2. A round bearing journal 21.1 which projects out through the bearing opening 16 of one U-leg 11.2 adjoins this triangular rotating body so as to be aligned with its center axis 17 to one side. A triangular insertion opening 18 which can be seen from FIG. 2 is constructed on the front side of this bearing journal 12.1 for the insertion of a socket wrench. The insertion opening 18 continues into an expanded opening of the rotating body in which a plug-in journal 29, as second bearing journal, can be inserted subsequently through the bearing opening 16 of the other U-leg 11.3.

The embossed portions formed in the two U-legs 11.2 and 11.3 to form the counter-projection 14 are shaped in such a way that a first stop 19, which cooperates with one of the rounded corners of the triangular rotating body 12 and is shown in FIGS. 1 and 2, and two other stops 19.1 and 19.2 which cooperate with the two other corners of the rotating body 12 are formed on the inside of the U-legs. In the quick-action connecting device 10 which is shown in section in FIG. 1 on the left-hand side, the rotating body 12 is shown in a position in which it presses with one corner against the inner stops 19 of the two U-legs 11.2 and 11.3, and accordingly spreads them, and rests against the stops 19.1 and 19.2 with its two other corners and accordingly clamps the spring in its insertion plane. The three stops 19, 19.1 and 19.2 are arranged in such a way that the stop 19 is acted upon first during a rotational movement of the rotating body 12 by ⅙ revolution and the spreading of the U-legs 11.2, 11.3 is effected before the clamping in the insertion plane is effected at the stops 19.1 and 19.2. In the quick-action connecting device shown on the right-hand side in FIG. 2, the rotating body 12 is shown in a position in which it does not contact the stops 19, 19.1 and 19.2 of the two U-legs of the locking body 11. Nevertheless, the two U-legs 11.2 and 11.3 according to FIG. 1 are spring-mounted in the locking position by means of the spring characteristic of the locking body 11, but can move inward toward one another and can accordingly easily lock into and out of an opening of a part to be held.

In the embodiment example shown in FIGS. 1 to 3, the insertion opening 18 forms a part of an opening which passes through the entire rotating body 12. A pin for pressing out the inserted plug-in journal 29 can be guided through this through-opening when a locking body 11 is to be exchanged.

Figure 4:
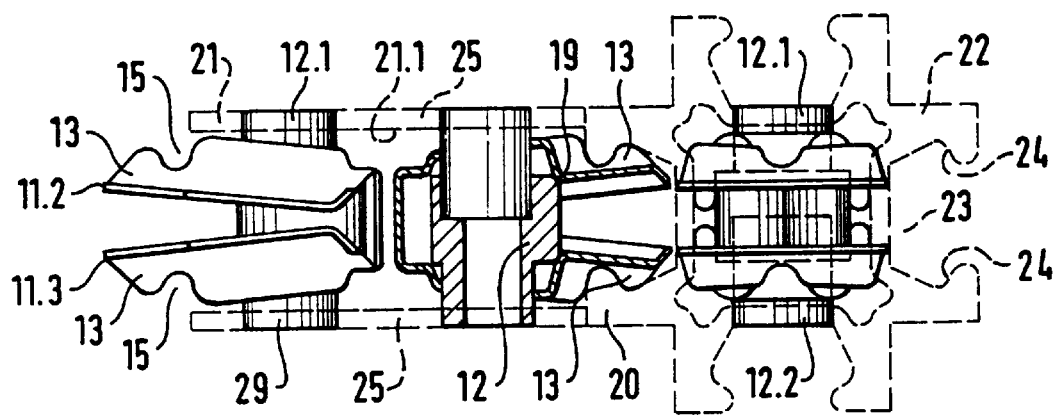
FIGS. 4 and 5, shows a quick-action connecting device inserted in a section rail and a pair of quick-action connecting devices arranged in a connection part coupled with the section rail corresponding to FIG. 1, shown in section in FIG. 4 along line IV—IV of FIG. 5.
Figure 5:
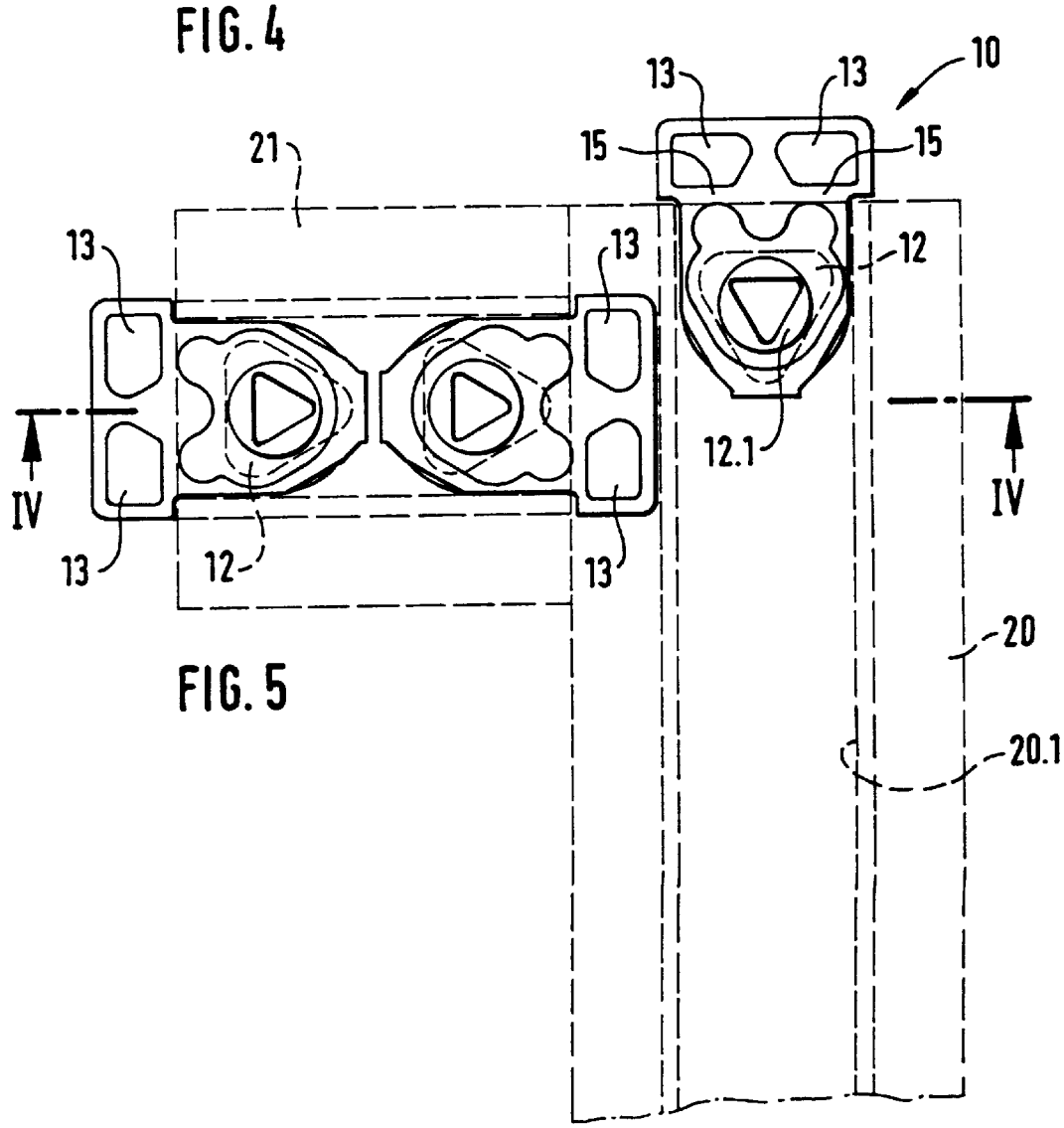

FIGS. 4 and 5 show a first example of application for quick-action connecting devices 10. A hollow extruded section rail 20 and a connection piece 21 are shown in FIGS. 4 and 5 in dashed lines. The section rail 20 has a square cross section with a central through-channel 20.1 and continuous longitudinal grooves 23 with undercut edges 24 are formed on all four sides between webs 22. The connection piece 21 likewise has a four-cornered cross section with a through-channel 21.1 and longitudinal slits 25 on two opposite sides.

A quick-action connecting device 10 of the type shown in FIGS. 1 to 3 is inserted at the end of the section rail 20 in its central through-channel 20.1 in such a way that the two U-legs of its springing locking body project out of the opening of the central through-channel 20.1 with their locking noses 13 and the adjoining locking groove 15. In so doing, the bearing journals 12.1 and 29 of the rotating body 12 which project on both sides over the U-legs project into bore holes or slots which are formed at the base of the longitudinal grooves 23 of the section rail 20 (see FIG. 4). In order to insert the quick-action connecting devices 10 into the connection piece 21, the plug-in journals 29 are removed. The rotating body 12 can accordingly be displaced in the locking body 11 in such a way that its bearing journal 12.1 almost disappears in the bearing opening 16. The plug-in journal 29 is inserted into the rotating body 12 only after insertion.

Two quick-action connecting devices 10 are inserted into the connection piece 21 in the mirror-inverted arrangement shown in FIG. 1 in such a way that they project out of the ends of the connection part 21 with their locking noses 13 and the locking groove 15 of their two U-legs 11.2 and 11.3. In so doing, the bearing journals 12.1 and 29 of the rotating body of these quick-action connecting devices again project into the slots 25 of the connection piece 21. One quick-action connecting device is locked into one of the longitudinal grooves 23, wherein the locking noses 13 project into the undercut portions 24 of the edges of the longitudinal groove 23 and are held in this locking position by means of the rotating body 12 which presses against the inner stops 19, 19.1 and 19.2 with its rounded corners.

Figure 6:
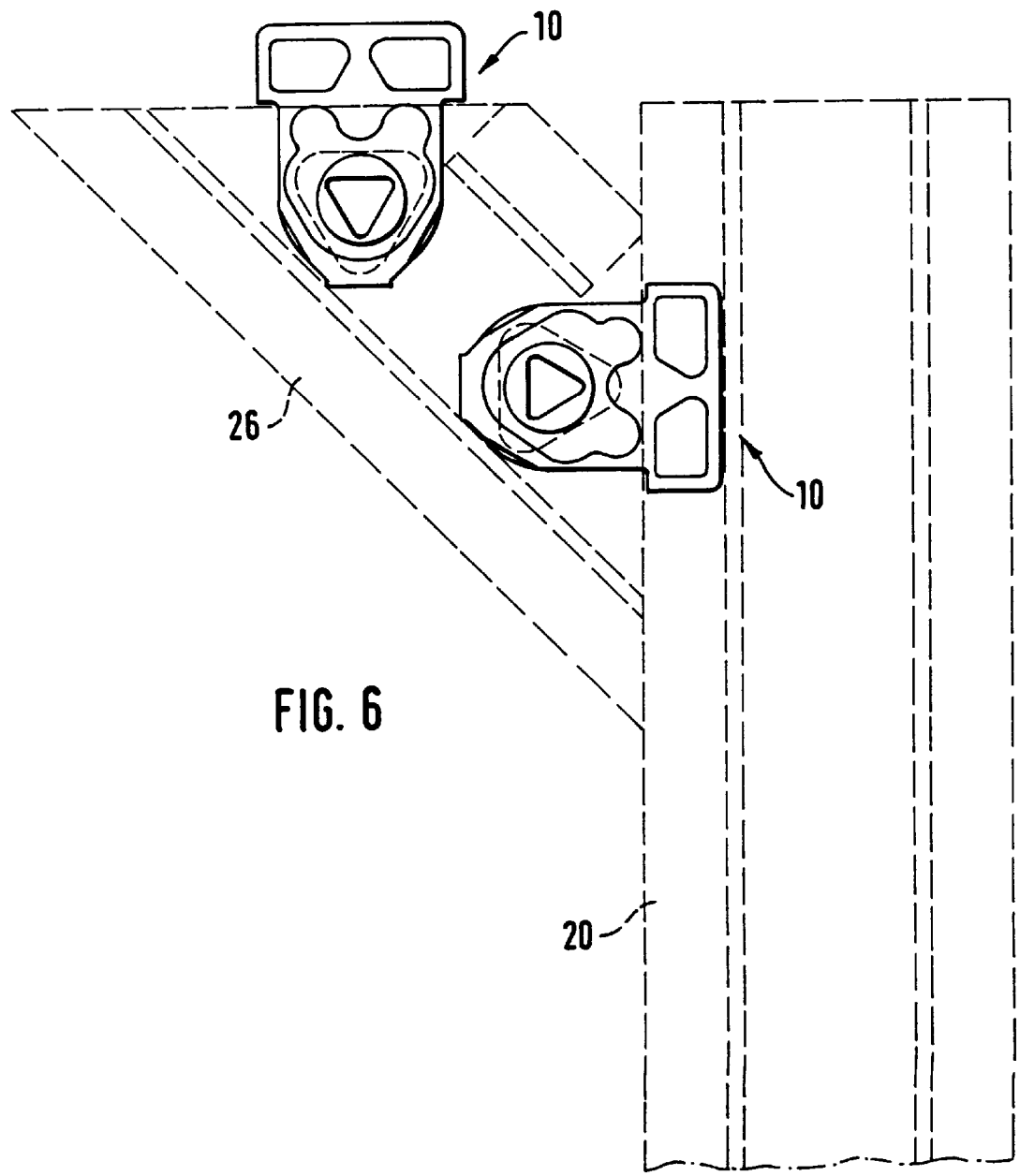
FIG. 6 shows two quick-action connecting devices in another instance of application.

FIG. 6 shows an example of application in which a mitered rail part 26 is connected with a section rail 20 by means of a quick-action connecting device 10. A second quick-action connecting device 10 of the type shown in FIGS. 1 to 3 is inserted into the rail part 26 in the servicing position. A second section rail which extends vertically relative to the first section rail 20 can be coupled with this second quick-action connecting device 10.

Figure 7:
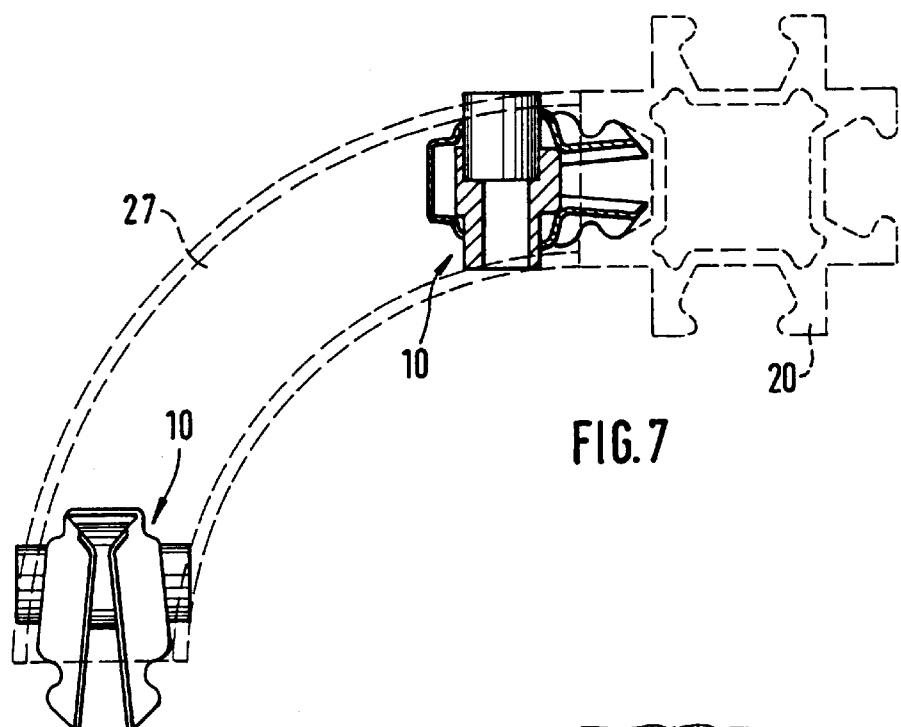
FIGS. 7 and 8 show two quick-action connecting devices in a third instance of application shown in FIG. 7 in section along line VII—VII in FIG. 8.
Figure 8:
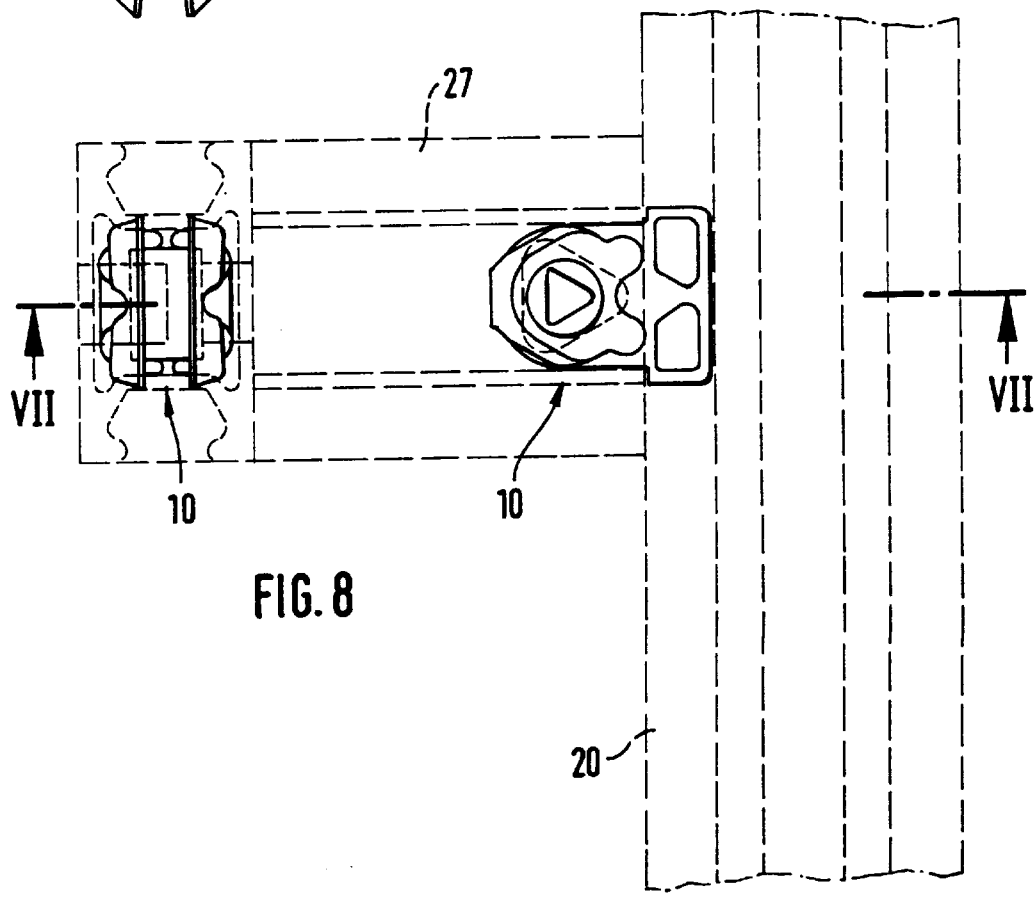

In the example of application shown in FIGS. 7 and 8, two quick-action connecting devices 10 are inserted into the ends of a curved hollow rail 27. The curved rail 27 is coupled with a section rail 20 in a manner already described in connection with FIGS. 4 and 5 with one quick-action connecting device 10 shown in section in FIG. 7.

A second embodiment form of a quick-action connecting device 10' is shown in FIGS. 9 to 11, which second embodiment form differs from the embodiment form shown in FIGS. 1 to 3 in that its locking body, which is formed from the leaf spring, comprises longer U-legs 11.1' and 11.2' and an individual continuous locking nose 13' at its ends. A rectangular intermediate body 28 is arranged between the triangular rotating body 12' and the inner stops 19' of the two U-legs and the rotating body 12', which inner stops 19' are constructed in the area of the outer locking grooves 15'. The rotating body 12' with bearing journals 12.1' and 29' is also supported in bearing openings of the two U-legs 11.1' and 11.2' in this embodiment form.

The quick-action connecting device can also be modified in such a way that the rotating body 12 is supported only by its bearing journal 12.1 and the plug-in journal 29 is omitted and replaced by a pressure spring which is supported at one U-leg of the locking body and presses the rotating body 12 in its bearing position.

FIGS. 12 to 17 show a second embodiment form of a quick-action connecting device 110 which is anchored in a connection piece 121 which is to be securely connected with a section rail 120. In this instance also, the quick-action connecting device 110 comprises a locking body consisting of a leaf spring, which is bent in a U-shaped manner and comprises a base part 110.1 and two relatively long U-legs 110.2, 110.3. The anchoring of the quick-action connecting device 110 in the connection piece 121 is effected by means of a bearing journal 111 around which the base part 110.1 of the leaf spring is placed and which projects into openings 125 of the connection part 121 with its ends according to FIG. 12. The widened free ends of the two U-legs 110.2, 110.3 are shaped to form locking noses 113 which pass into the planar U-legs 110.2, 110.3 via a locking groove 115.

The two U-legs 110.2, 110.3 are also provided with bearing openings 116 for bearing journals 112.1 of a rotating body 112 in the locking device 110. However, the rotating body 112 is in the form of a double-armed swiveling lever. Its one, longer arm 112.2 forms the projection acting on the ends of the U-legs 110.2, 110.3 in the area of the locking grooves 115, while the other, shorter arm 112.3 forms a point of application for a locking tool 130 which can be seen from FIGS. 14 and 16.

The section rail 120 has the same cross section as the section rail 20 which can be seen from FIGS. 4 and 5, i.e. also the same outer longitudinal grooves 123 with undercut edges 124.

Figure 12:
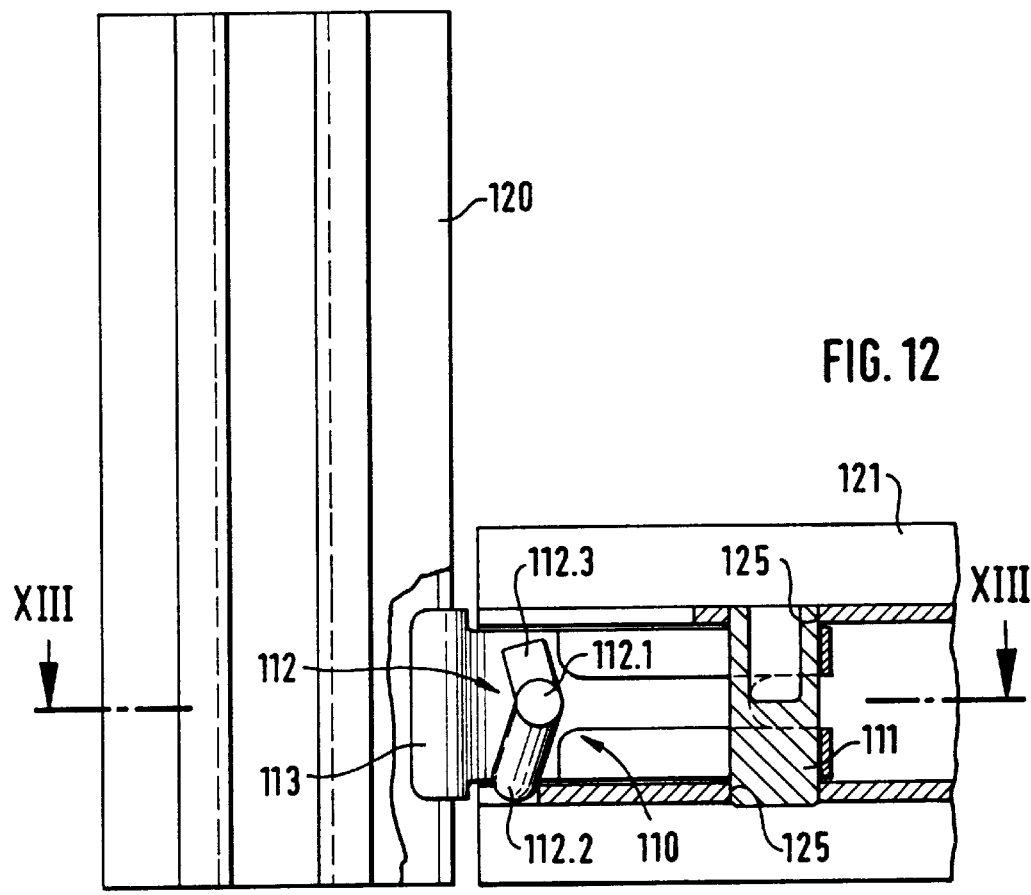
FIG. 12 shows a second embodiment form of a quick-action connecting device anchored in a section rail with its locking noses inserted in a second section rail, partially in section.
Figure 13:
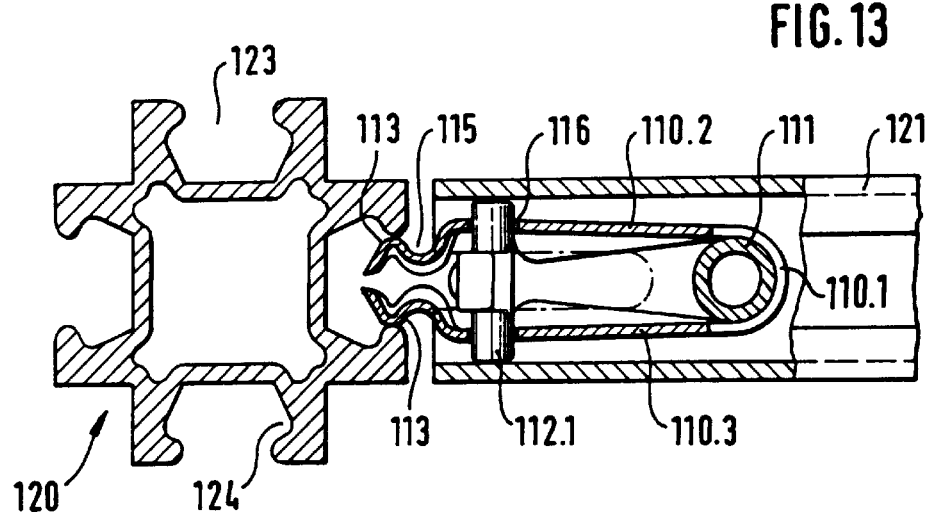
FIG. 13 shows a section along line XIII—XIII in FIG. 12.
Figure 14:
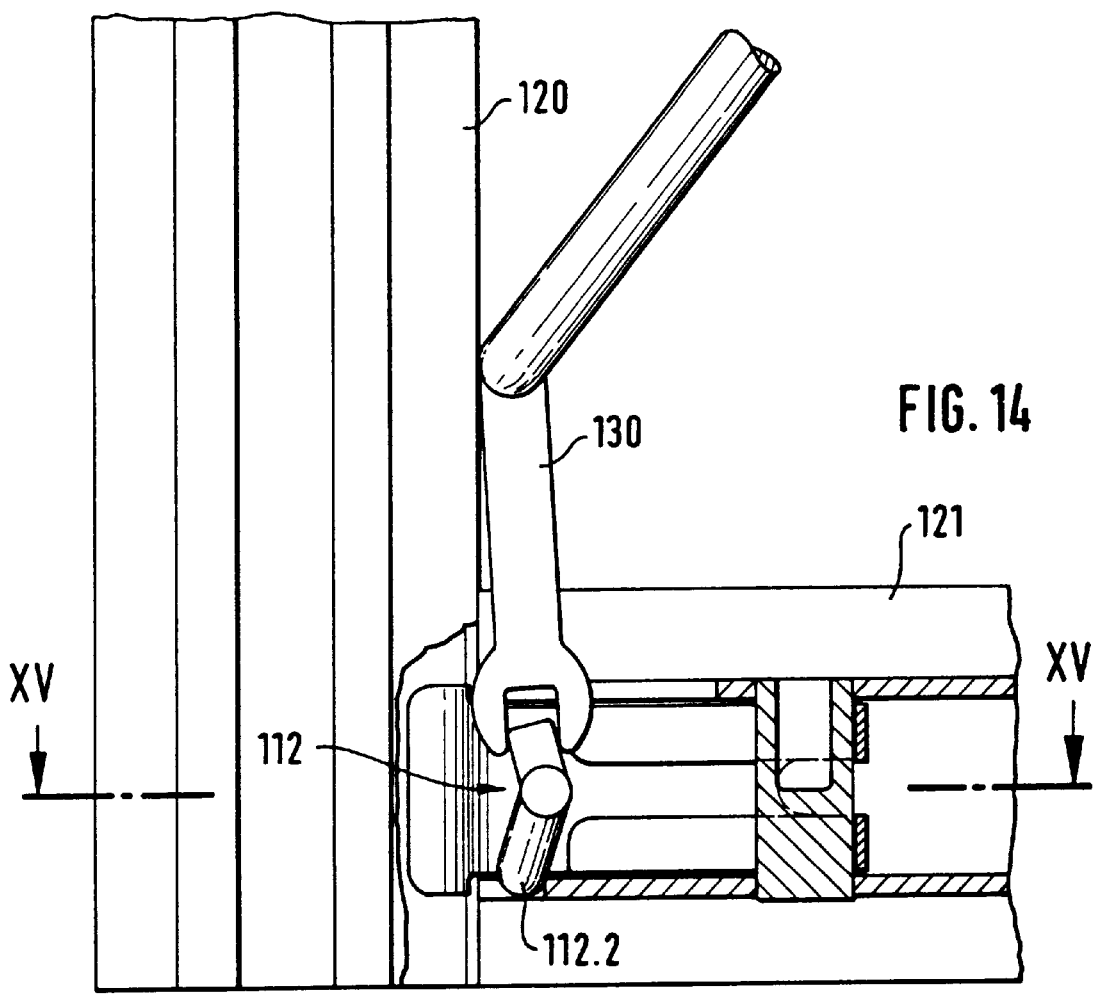
FIG. 14 shows an illustration corresponding to FIG. 12 after the locking noses of the quick-action connecting device have locked in the section rail, with applied locking tool, but with the rotating body still in the rest position.
Figure 15:
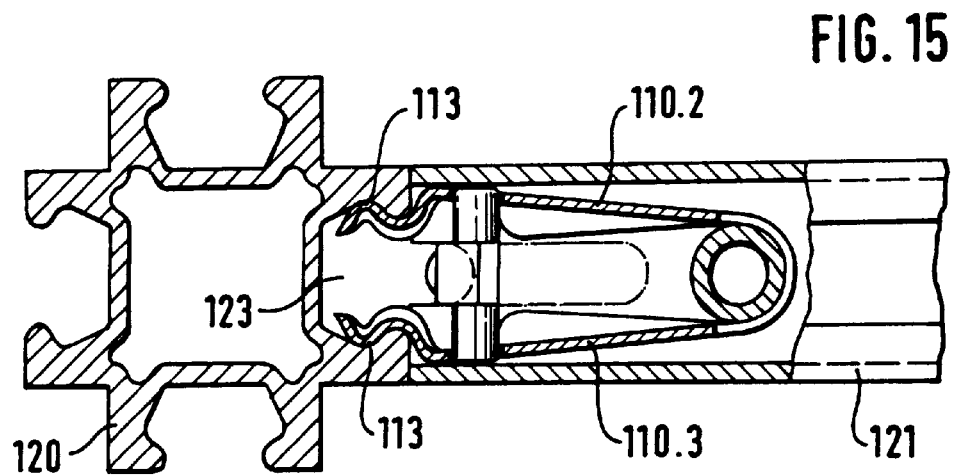
FIG. 15 shows a section along line XV—XV in FIG. 14.

FIGS. 12 and 13 show how the quick-action connecting device 110 anchored in the connection part 121 is inserted into the opening of an undercut longitudinal groove 123 accompanied by inward springing of the locking noses 113. FIGS. 14 and 15 show the quick-action connecting device after insertion of the locking noses 113 into the longitudinal groove 123. The locking noses 113 of the spring-mounted U-legs 110.2, 110.3 are locked into the undercut portions 124 of the longitudinal groove 123. However, the rotating body 112 is still located in its initial position in which its longer swivel arm 112.2 does not act on the locking body. Thus, a locking connection is already effected between the parts 121 and 120 in this position, which locking connection can be detached again at any time by means of withdrawing the connection part 121.

Figure 16:
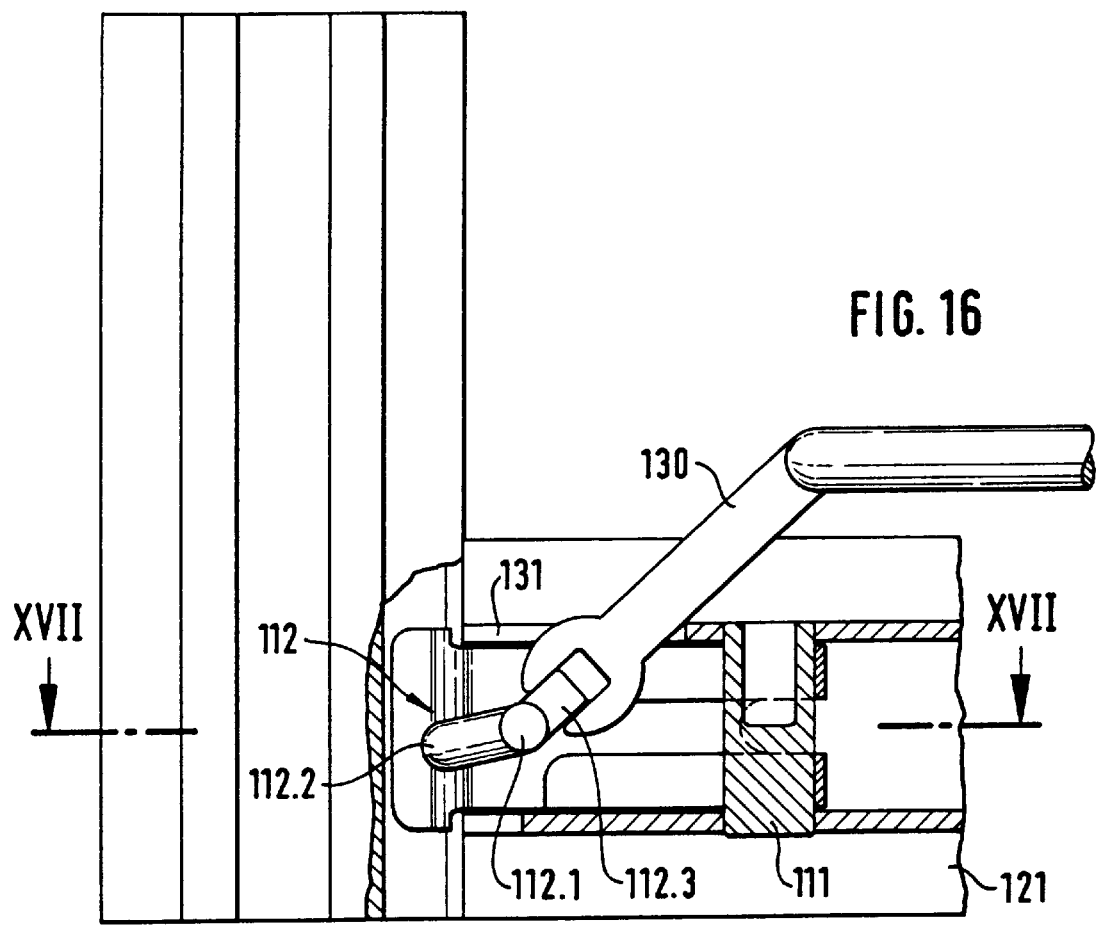
FIG. 16 shows a view corresponding to FIGS. 12 and 14 with the rotating body of the quick-action connecting device brought into the clamping position.
Figure 17:
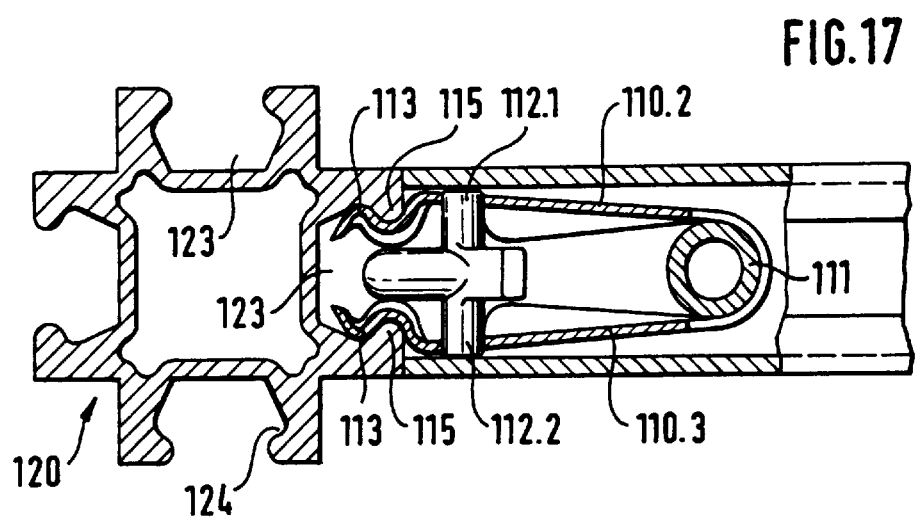
FIG. 17 shows a section along line XVII—XVII in FIG. 16.

After applying a locking tool 130 according to FIG. 14 and swiveling the locking tool in the clockwise direction, the rotating body 112, which is constructed as a swivel arm, can be brought into the locking position, seen in FIGS. 16 and 17. In this position it clamps the two locking noses 113 of the quick-action connecting device 110 in its previously occupied locking position. The longer lever arm 112.2 is slid between the two U-legs 110.2, 110.3 in the area of the locking grooves 115 and accordingly prevents them from springing back. When locking, the locking noses 113 are inserted into the undercut portions 124 of the longitudinal groove 123 which are provided with diagonal walls, so that a tensile force is also exerted on the legs 110.2, 110.3 which is absorbed by the bearing journal 111 and clamps the end of the connection piece 121 against the section rail 120. The specially shaped locking tool 130, which can be inserted through a narrow slot 131 in the connection piece 121 and abuts against the edge of this slot 131 after reaching the locking position of the rotating body 112, is removed. The bearing journals 112.1 of the rotating body 120 lie behind a continuous, smooth and uninterrupted wall of the connection part 121 according to FIGS. 12, 14 and 16 and accordingly remain invisible.

Figure 20A:
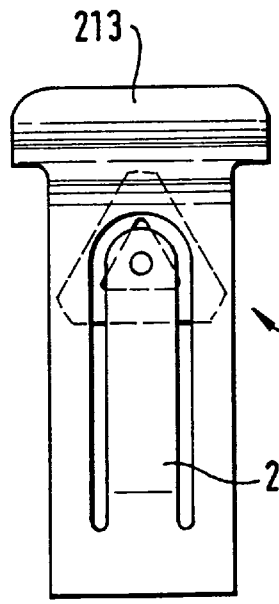
FIGS. 20a and 20b show a view of the quick-action connecting device from the bottom in the two positions of the rotating body.
Figure 19A:
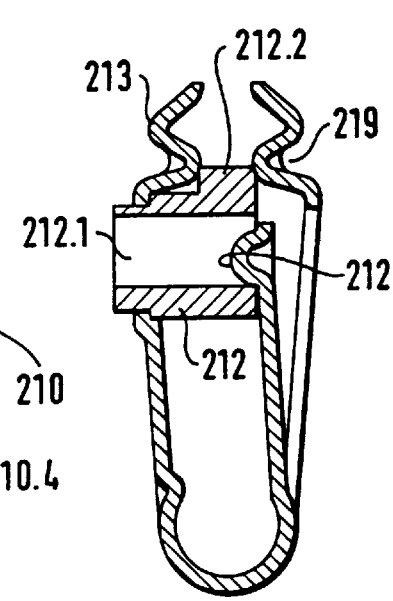
FIGS. 19a and 19b show a central longitudinal section through the quick-action connecting device along line XIX—XIX in FIGS. 18a, 18b.
Figure 18A:
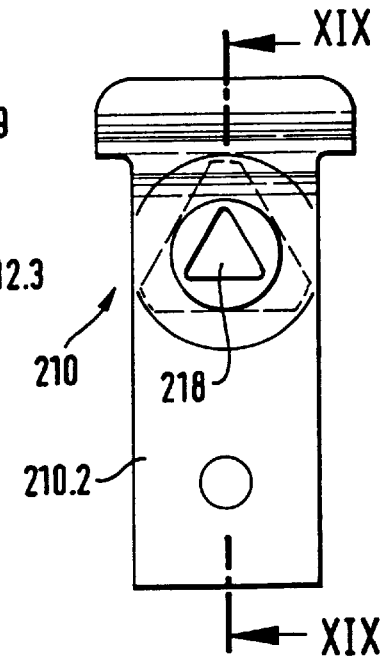
FIGS. 18a and 18b show a top view of a third embodiment form of the quick-action connecting device, in the locking position of the rotating body on the one hand and in the detaching position of the rotating body on the other hand.
Figure 20B:
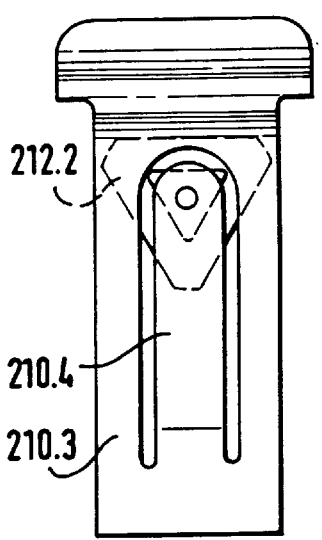
Figure 19B:
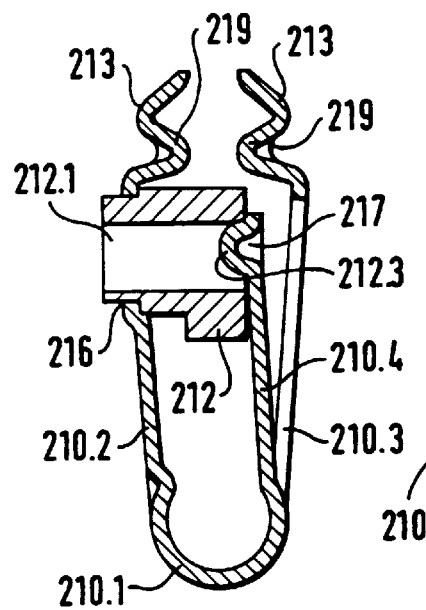
Figure 18B:
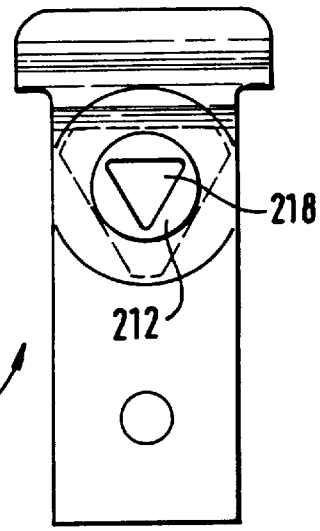

A third embodiment example of a quick-action connecting device 210 which is practically a combination of the two described embodiment forms is shown in FIGS. 18 to 20. The locking body, which again consists of a leaf spring which is bent in a U-shaped manner, has the basic form of the locking device 110, i.e. a base part 210.1 and two relatively long U-legs 210.2 and 210.3. One U-leg comprises a bearing opening 216 for a bearing journal 212.1 of a rotating body 212. A triangular insertion opening 218 for a socket wrench is formed on the front side of the bearing journal 212.1. As in the rotating body 12 of the first embodiment example, the rotating body 212 has a cross section in the shape of an equilateral triangle with corners 212.2. On its end opposite the bearing journal 212.1, the rotating body 212 comprises a bearing trough 212.3 with which the rotating body 212 sits on a projection 217 which is constructed at the end of a spring tab 210.4 which is stamped out and bent out of the U-leg 210.3.

The corner 212.2 of the rotating body 212 acts on inner stops 219 in the end areas of the U-legs 210.2 and 210.3, which are constructed in proximity to the locking noses 213 of the leaf spring for spreading these locking noses 213, that is, in the same manner as the rotating body 12 in the first described embodiment example.

In contrast to the second embodiment example, the quick-action connecting device 210 can also be used without bearing journals 111 (FIG. 13) if the bearing journals 212.1 of the rotating body 212 are allowed to dip into a recess of a section rail as in the first embodiment example. In order to insert the quick-action connecting device 210 into a connection piece, the rotating body 212 can be pressed against the restoring force of the spring tab 210.4 between the two U-legs 210.2 and 210.3 by means of pressing on its bearing journal until the front side of the bearing journal 212.1 extends so as to be flush with the outside of the U-leg 210.2.

It will be understood that each of the elements described above, or two or more together, may also find a useful application in other types of constructions differing from the types described above.

While the invention has been illustrated and described as embodied in a quick-action connecting device for detachable connection of wall or frame parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A quick-action connecting device for detachable connection of wall or frame parts and anchorable in one of the parts to be connected with one another, the quick-action connecting device comprising an adjustable locking body including a leaf spring which is bent in a U-shaped manner and has legs with leg ends shaped to form locking noses which can dip into an undercut opening of another of the parts to be connected with one another; a rotating body arranged to act on said adjustable locking body to clamp the latter, said locking noses being insertable in said undercut opening so that said legs move toward one another and then locked by a subsequent springing back of said legs, said legs being provided with a bearing opening for receiving said rotating body, said rotating body having at least one projection acting on said legs so as to spread them apart, said rotating body having a cross-section of an equilateral triangle with rounded corners.

2. A quick-action connecting device for detachable connection of wall or frame parts and anchorable in one of the parts to be connected with one another, the quick-action connecting device comprising an adjustable locking body including a leaf spring which is bent in a U-shaped manner and has legs with leg ends shaped to form locking noses which can dip into an undercut opening of another of the parts to be connected with one another; a rotating body arranged to act on said adjustable locking body to clamp the latter, said locking noses being insertable in said undercut opening so that said legs move toward one another and then locked by a subsequent springing back of said legs, said legs being provided with a bearing opening for receiving said rotating body, said rotating body having at least one projection acting on said legs so as to spread them apart, said rotating body having three projections, said leaf spring having at every leg a first curved out portion cooperating with one of said projections of said rotating body and effecting a spreading of said legs, and a second and a third curved out portion cooperating with two other of said projections of said rotating body and effecting a pretensioning in an insertion plane.

3. A quick-action connecting device for detachable connection of wall or frame parts and anchorable in one of the parts to be connected with one another, the quick-action connecting device comprising an adjustable locking body including a leaf spring which is bent in a U-shaped manner and has legs with leg ends shaped to form locking noses which can dip into an undercut opening of another of the parts to be connected with one another; a rotating body arranged to act on said adjustable locking body to clamp the latter, said locking noses being insertable in said undercut opening so that said legs move toward one another and then locked by a subsequent springing back of said legs, said legs being provided with a bearing opening for receiving said rotating body, said rotating body having at least one projection acting on said legs so as to spread them apart, said rotating body having an end which projects out through said bearing opening of one of said legs and so that a turning tool can be applied to said end, another of said legs having a bearing projection which is constructed as a spring tab bent out of said another leg and having a bearing trough, said rotating body having another end cooperating with said bearing trough.

4. A quick-action connecting device for detachable connection of wall or frame parts and anchorable in one of the parts to be connected with one another, the quick-action connecting device comprising an adjustable locking body including a leaf spring which is bent in a U-shaped manner and has legs with leg ends shaped to form locking noses which can dip into an undercut opening of another of the parts to be connected with one another; a rotating body arranged to act on said adjustable locking body to clamp the latter, said locking noses being insertable in said undercut opening so that said legs move toward one another and then locked by a subsequent springing back of said legs, said legs being provided with a bearing opening for receiving said rotating body, said rotating body having at least one projection acting on said legs so as to spread them apart, each of said legs being bent in a U-shaped manner and having a counter-projection facing inwardly so that a locking groove is formed between said counter-projection and said locking noses.

5. A quick-action connecting device for detachable connection of wall or frame parts and anchorable in one of the parts to be connected with one another, the quick-action connecting device comprising an adjustable locking body including a leaf spring which is bent in a U-shaped manner and has legs with leg ends shaped to form locking noses which can dip into an undercut opening of another of the parts to be connected with one another; a rotating body arranged to act on said adjustable locking body to clamp the latter, said locking legs move toward one another and then are locked by a subsequent springing back of said legs, said legs being provided with a bearing opening for receiving said rotating body, said rotating body having at least one projection acting on said legs so as to spread them apart, said rotating body having a front side and at least one insertion opening provided on said front side for a tool for turning said rotating body, said rotating body having a part which projects out through said bearing opening of one of said legs and is provided with said insertion opening; and a plug-in bearing projecting through said bearing opening of another of said legs, said rotating body having another opening for receiving said plug-in bearing.

\* \* \* \* \*